United States Patent [19]

Simmers

[11] 4,446,027
[45] May 1, 1984

[54] BUOYANT MEDIA FILTER

[75] Inventor: Kathleen W. Simmers, Cockeysville, Md.

[73] Assignee: Environmental Elements Corp., Baltimore, Md.

[21] Appl. No.: 421,816

[22] Filed: Sep. 23, 1982

Related U.S. Application Data

[63] Continuation of Ser. No. 135,169, Mar. 20, 1980, abandoned.

[51] Int. Cl.³ .................. B01D 23/10; B01D 23/24
[52] U.S. Cl. .................... 210/661; 210/786; 210/795; 210/275; 210/285; 210/291
[58] Field of Search ............ 210/264, 266, 275, 274, 210/279, 289, 291, 293, 661, 715, 786, 795, 263, 283–285; 422/143, 311

[56] References Cited

U.S. PATENT DOCUMENTS

| Re. 29,996 | 5/1979 | Jordan et al. | 210/293 X |
|---|---|---|---|
| 2,093,311 | 9/1937 | Craig | 210/266 X |
| 2,944,009 | 7/1960 | Huntley et al. | 422/143 X |
| 3,077,987 | 2/1963 | Morimoto | 210/289 X |
| 3,202,286 | 8/1965 | Smit | 210/293 X |
| 3,493,116 | 2/1970 | Edmiston | 210/266 |
| 3,623,978 | 11/1971 | Boze et al. | 210/283 X |
| 3,840,117 | 10/1974 | Ross | 210/274 X |
| 4,290,894 | 9/1981 | Torok et al. | 210/661 |

FOREIGN PATENT DOCUMENTS

| 816481 | 7/1969 | Canada | 210/275 |
|---|---|---|---|
| 313149 | 6/1919 | Fed. Rep. of Germany | 210/284 |
| 1142797 | 1/1963 | Fed. Rep. of Germany | 210/275 |
| 2336030 | 1/1975 | Fed. Rep. of Germany | 210/283 |
| 820998 | 11/1937 | France | 210/264 |
| 1280576 | 12/1962 | France | 210/283 |
| 1363510 | 12/1964 | France | 210/275 |

Primary Examiner—Robert H. Spitzer
Attorney, Agent, or Firm—Morton J. Rosenberg

[57] ABSTRACT

An upflow, buoyant media filter for industrial and municipal water and wastewater treatment is disclosed. The filter bed is supported in a tank such that there is defined an influent reservoir below the filter bed and an effluent reservoir above the filter bed. By inducing a continuous circulating flow of influent within the influent reservoir, the waste is slowly agitated allowing it to coagulate. As the waste particles are carried to the relatively quiescent areas near the perimeter of the tank, those that are heavy enough settle to the bottom of the tank. The lighter particles are carried along in the circulating flow to continue the coagulation process. Waste particles which do not settle out are ultimately removed by the filter media. As the waste particles build up on the surface of the filter media, they agglomerate. As their density increases, these particles tend to drop off of their own weight or may be scoured off by the circulating flow of influent. This self-cleaning process permits less frequent backwashing of the filter.

11 Claims, 4 Drawing Figures

BUOYANT MEDIA FILTER

This is a continuation of application Ser. No. 135,169, filed Mar. 20, 1980, now abandoned.

BACKGROUND OF THE INVENTION

1. Field of the Invention

The present invention relates to filtering solids from liquids and, more specifically, to a novel upflow, buoyant media filter for industrial and municipal water and wastewater treatment. In particular, the invention is directed to a novel method and apparatus for the upflow filtration of liquids which permits for greatly increased hydraulic and solids loading over what was heretofore available in the art.

2. Description of the Prior Art

The use of buoyant media in filters and various fluid contacting devices is, of itself, well known as evidenced by U.S. Pat. Nos. 468,984, 2,742,381, 3,122,594, 3,150,076, 3,424,674 and 3,471,025. Moreover, it is known that a floating filter bed is used in a lamella sedimentation chamber manufactured under the name "Rozka-filter," by Altron-Eco-Supply BV, Nijverheidstraat 7, Wormerveer, The Netherlands. However, none of these prior art devices are considered to be relevant, either in their organization or operation, to the novel method and apparatus of this invention.

SUMMARY OF THE INVENTION

The present invention discloses a novel upflow, buoyant media filter designed primarily for industrial and municipal water and wastewater treatment. The filter bed of the apparatus of this invention is supported in a tank such that there is defined an influent reservoir below the filter bed and an effluent reservoir above the filter bed. By inducing a continuous circulating flow of influent within the influent reservoir, the waste in the turbid influent is slowly agitated allowing it to coagulate. As the waste particles are carried to the relatively quiescent areas near the perimeter of the tank, thse that are heavy enough settle to the bottom of the tank. The lighter particles are carried along in the circulating flow to continue the coagulation process. Waste particles which do not settle out are ultimately removed by the filter media. As the waste particles build up on the lower surface of the filter media, they agglomerate. As their density increases, these particles tend to drop off of their own weight or may be scoured off by the circulating flow of influent. This self-cleaning process permits less frequent backwashing of the filter. Moreover, greatly increased hydraulic and solids loadings are possible and, thus, for a given water treatment requirement, permits a substantial reduction in the size and the cost of the unit needed.

In particular, the apparatus of this invention broadly comprises a tank or vessel having porous sheet means mounted substantially horizontally in the upper portion of the tank. The porous sheet means supports buoyant filter media at its lower surface and defines with the tank an effluent reservoir above the porous sheet means and an influent reservoir below the porous sheet means. In addition, the tank is provided with suitable means to induce a continuous rising and falling circulating flow of influent through the influent reservoir to promote rapid coagulation and settling of wastes. In operation, turbid influent is fed into the influent reservoir in the bottom of the tank. A continuous rising and falling circulating flow is induced to the influent to promote rapid coagulation. The influent continuously passes upwardly, at the same rate that it is being fed, into an effluent reservoir and, thence, from the tank as clear effluent.

The foregoing, and other objects, features and advantages of this invention will become more apparent when taken in conjunction with the following specification, the accompanying drawings and the appended claims.

DESCRIPTION OF THE PREFERRED EMBODIMENT

Figure 2:
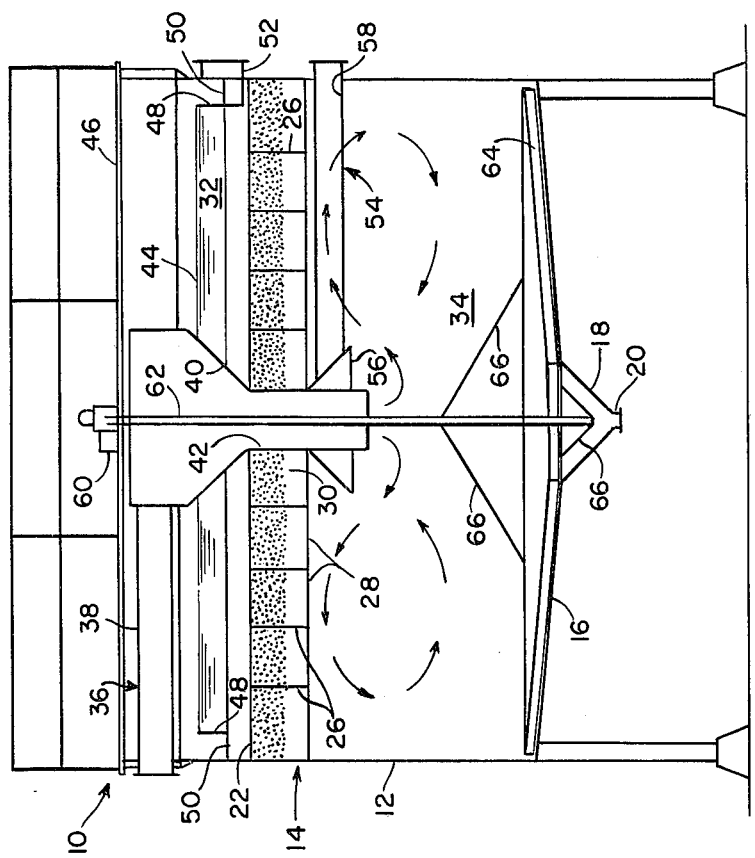
FIG. 2 is a typical section of the circular filter of FIG. 1, generally taken along the line II—II thereof, with cross-hatching omitted and the influent, effluent and backwash piping rotated to the plane of the cross section for clearer illustration of the invention.
Figure 1:
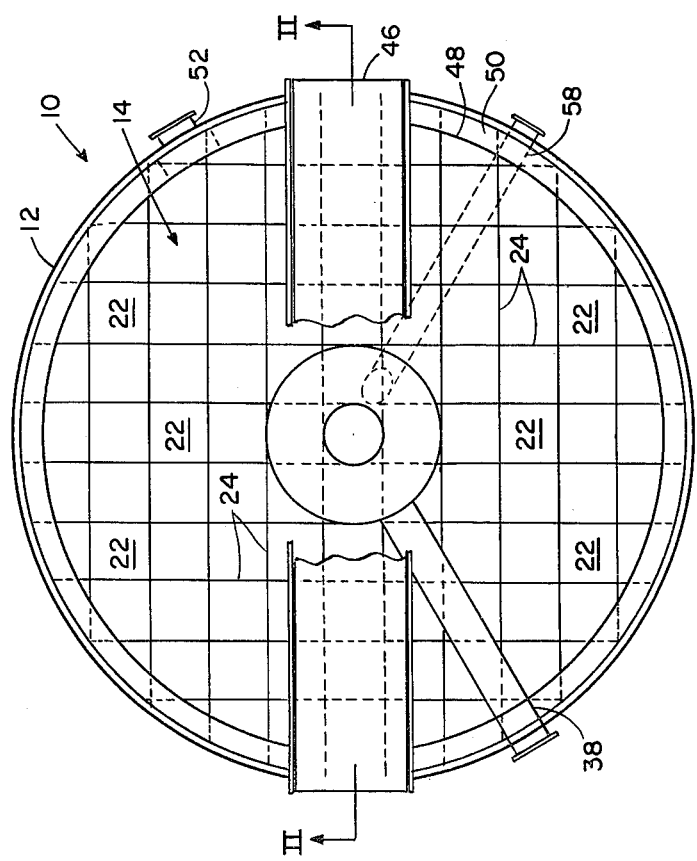
FIG. 1 is a schematic plan view of one embodiment of a buoyant media filter constructed in accordance with this invention, with certain parts broken away for the sake of clarity.

Referring to FIGS. 1 and 2, there is illustrated a buoyant media filter 10 embodying the principles of this invention. Shown is a circular tank or vessel 12 having filter means 14 mounted substantially horizontally in its upper portion and having a generally conically shaped bottom 16 containing a sludge cone 18. Sludge cone 18 is provided with an outlet conduit 20 to be fitted with a suitable valve (not shown) for selectively opening and closing the sludge outlet conduit 20.

Filter means 14, in the embodiment shown, includes a plurality of rectangular or square porous sheets 22, preferably of polyethylene bead material, suitably supported in the upper portion of tank 12 by any suitable means, such as a grid or gridwork 24 of angle braces, or the like. Also conveniently supported by said grid or gridwork of bracing and extending downwardly from each side of the rectangular porous or permeable sheets 22 are buoyant media cell-forming sheets 26 which may desirably be made of a fiber glass reinforced plastic material, such as a glass reinforced polyester. In this manner there is formed a honeycomb-like gridwork or a plurality of sets of downwardly open polygonal cells 28 for the purpose of supporting and containing therewithin a buoyant filter media 30. Obviously, the cells 28 at the perimeter of the circular tank 12 are other than square or rectangular cells and thus porous sheet material 22, at these locations, must be shaped or contoured to fit the circular contour of the tank. Obviously, also, the cell-forming or wall-forming sheets 26, a these locations, need only to extend down from the sides of the porous sheet material 22 that do not abut the inner surface of tank 12, i.e., the non-contoured sides. Constructed and arranged as hereinabove described, porous or permeable sheets 22 define with tank 12 an effluent reservoir 32 above the porous sheets 22 and an influent reservoir 34 below the porous sheets.

As is further illustrated in FIGS. 1 and 2, tank 12 is provided with an influent feed conduit 36, generally comprising an initial influent conduit section 38, a stilling well 40 and a terminal influent conduit section 42. Initial feed conduit section 38 is shown as extending radially, inwardly from the side of the tank 12, at an elevation above that of the effluent water level 44. The inner end of feed conduit section 38, as shown, is in fluid communication with the generally inverted, frusto-conical stilling well 40, which is supported centrally of the circular tank 12 by an overlying tank catwalk 46. Thence, terminal feed conduit 42 extends vertically, downwardly from stilling well 40, through filter means 14, to a location within an upper central zone of influent reservoir 34.

For the purpose of feeding or removing clear effluent from the filter tank, filter tank 12 is provided with an annular weir 48 and effluent trough 50 positioned above porous sheets 22 and extending completely around the perimeter of the effluent reservoir 32. As shown, communicating with effluent trough 50 and extending through the side of circular tank 12, at some convenient location, is an effluent outlet pipe or conduit 52.

Also shown in FIGS. 1 and 2, the operation of which will be explained hereinafter, is backwash apparatus 54. Backwash apparatus 54 includes a downwardly open frusto-conical hood 56 attached to a lower portion of influent conduit section 42 at about the lower level of the cell-forming sheets 26. Connected to hood 56 and in fluid communication therewith and with the outside of circular tank 12 is a backwash pipe or conduit 58 which is to be fitted outside the tank with a backwash valve (not shown) to selectively permit or close off fluid flow through conduit 58.

For sludge thickening and collecting purposes, the filter embodiment of FIGS. 1 and 2 is shown as being provided with a conventional sludge removal mechanism or sludge rake mechanism. The sludge removal mechanism, as shown, is comprised of a scraper drive 60 mounted on the upper surface of catwalk 46 and torque tube 62 extending downwardly through the center of stilling well 40 and influent conduit section 42 and connected at its lower extremity to scraper blades 64 by suitable bracing arms 66. Additionally, if desired, filter 10 may be provided with conventional flocculator paddles (not shown) and/or a stilling well skimmer (not shown) of any suitable design. These devices are so well known to those skilled in the art that it is not deemed necessary to provide a specific illustration or explanation of their organization and/or operation.

Figure 4:
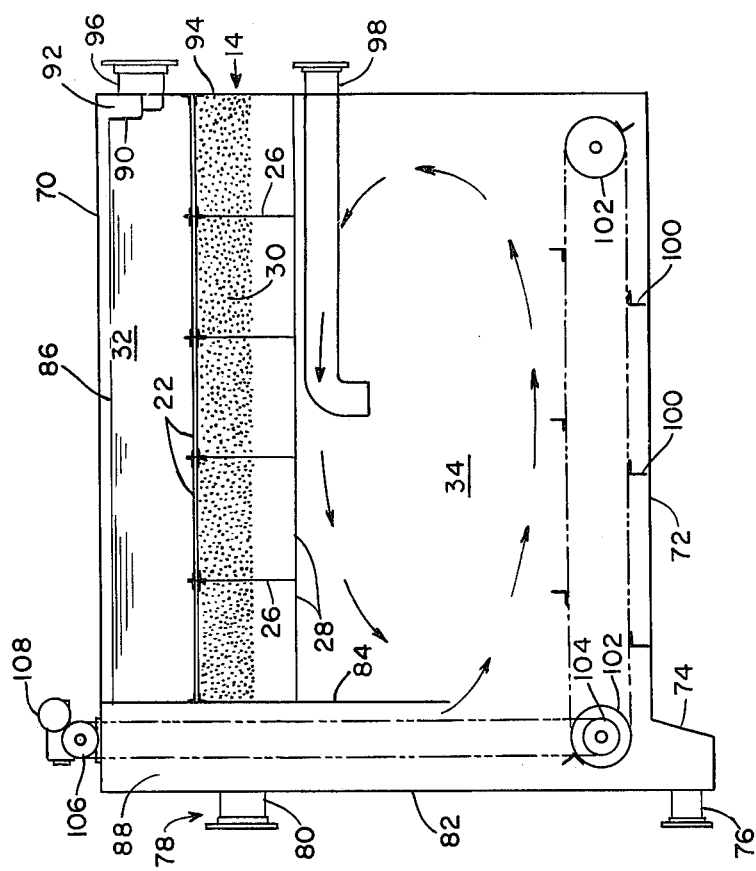
FIG. 4 is a typical cross section of the rectangular buoyant media filter of FIG. 3, generally taken along the line IV—IV thereof, with cross-hatching and certain details omitted for clarity of understanding.
Figure 3:
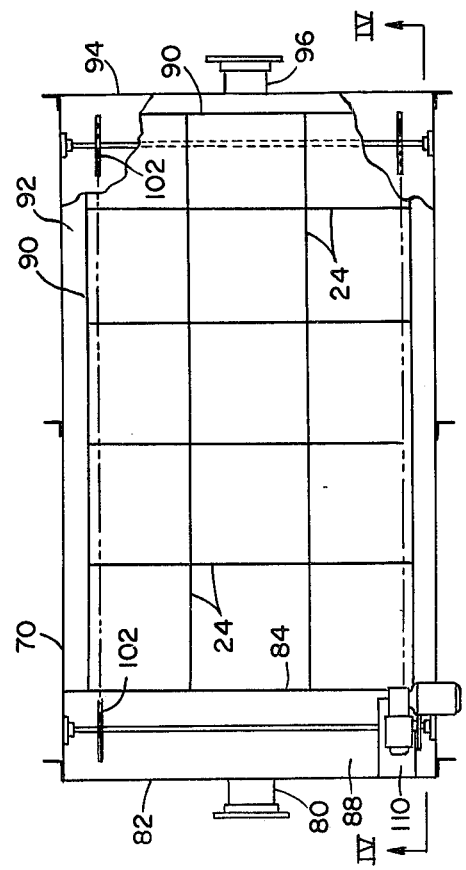
FIG. 3 is a schematic plan view, partly broken away, of a second embodiment fo the present invention.

Referring now to FIGS. 3 and 4, there is schematically shown another embodiment of this invention. While the organization and operation of the apparatus illustrated in FIGS. 3 and 4 is slightly different from that of FIGS. 1 and 2, the overall principle of operation remains the same. More specifically, the principal difference in the embodiment of FIGS. 3 and 4, compared to that of FIGS. 1 and 2, is the geometry of the tank shape and the means for providing and the location of the influent inlet to the filter. Accordingly, that which has already been described applies to a large measure to that which follows and, therefore, for convenience, like numerals employed in FIGS. 1 and 2 will be employed in FIGS. 3 and 4 to indicate like parts throughout the same.

Shown in FIGS. 3 and 4 is a rectangular tank or vessel 70 having filter means 14, generally identical to that of FIGS. 1 and 2, mounted substantially horizontally in its upper portion and having a generally flat bottom 72 with a sludge trough 74 extending across one end. Sludge trough 74 is provided with an outlet conduit 76 to be fitted with a suitable valve (not shown) for selectively opening and closing the sludge outlet conduit 76.

Filter means 14 in FIGS. 3 and 4 is, as aforesaid, generally identical to that of FIGS. 1 and 2. The only difference relates to perimeter edge treatment wherein, in this case, the perimeter edges are linear as opposed to the arcuate or circular edge configuration required by circular tank 12 of FIGS. 1 and 2. In other respects, filter means 14 of FIGS. 3 and 4 is comprised of porous sheets 22 supported by a gridwork 24 of braces and having cell-forming sheets 26 forming a honeycomb-like gridwork of downwardly open cells 28 for the purpose of supporting and containing therewithin buoyant filter media 30. Again, constructed and arranged as hereinabove described, porous or permeable sheets 22 defined with tank 70 an effluent reservoir 32 above the porous sheets 22 and an influent reservoir 34 below the porous sheets.

The influent feed conduit, indicated generally at 78 in FIGS. 3 and 4, comprises an influent pipe or conduit 80 extending through an upper central portion of one end wall 82 of tank 70 and having a baffle wall 84 disposed inwardly of the tank with respect to end wall 82. Baffle wall or inwardly disposed feed conduit wall 84 extends from side to side of the tank and from above the effluent water level 86 to a location intermediate filter means 14 and the bottom of the tank 72. Essentially what this arrangement provides is a rectangular stilling well 88 at one end of the tank 70, having an open bottom to permit introducing influent into the lower regions of influent reservoir 34 at that end of tank 70.

For the purpose of removing or feeding clear effluent from the filter tank, filter tank 70 is provided with a continuous weir 90 and effluent trough 92 positioned above porous sheets 22 and extending across the tank at the end opposite stilling well 88 and down or along both sides of the tank to the stilling well baffle wall 84. As illustrated, communicating with effluent trough 92 and extending through tank end wall 94 is an effluent outlet pipe or conduit 96.

The backwash arrangement of FIGS. 3 and 4 simply comprises a backwash pipe or conduit 98 extending through an upper, central portion of tank end wall 94 and terminating with an open, downwardly turned elbow in the central, upper region of influent reservoir 34, below filter means 14. Backwash pipe or conduit 98 is, of course, intended to be fitted outside the tank with a backwash valve (not shown) to selectively allow or close off fluid flow through conduit 98.

For sludge thickening and collecting purposes, the filter embodiment of FIGS. 3 and 4 is provided with a conventional sludge removal or sludge scraper mechanism. Essentially, the sludge scraper mechanism shown is comprised of a continuous horizontal run of evenly spaced apart scraper arms 100, extending from side to side of the tank and fixedly mounted at their ends to continuous pintle chains, which are trained over interconnected sprocket pairs 102 located at each end of the tank. As shown, the sprocket pair nearest the sludge trough is provided with an additional sprocket 104 connected to a continuous vertical run of pintle chains to scraper drive sprocket 106 and scraper drive 108 suitably mounted on the top of the tank on a platform 110 overlying a portion of stilling well 88. In a manner of operation well understood by those skilled in the art, this arrangement permits for continuous scraping and removal of sludge from the bottom of tank 70 into sludge trough 74. Additionally, as aforesaid, if so desired, filter tank 70 may be provided with conventional flocculator paddles (not shown) and/or a stilling well skimmer (not shown) for any suitable design.

In operation of both of the buoyant media filter embodiments of this invention, the influent waste, with coagulation aids added, if required, enters the stilling well. The top section of the well forms a stilling area which allows floating material to rise to the surface. This can be removed with a skimmer. The waste exits the well under a design hydraulic head and controlled flow rate into the influent reservoir or flocculation/-clarification section of the filter. The flow in this area forms a continuous rising and falling circular on circulating flow of influent that slowly agitates the waste in the direction of the arrows shown, allowing it to coagulate. As particles are carried to the quiescent areas near the perimeter of the tank, those that are heavy enough settle to the bottom of the tank. The lighter particles are carried along in the circulating flow to continue the coagulation process.

Waste particles which do not settle out are removed by the filter. The granular filter media is buoyant and is held submerged in the unit by the porous retaining sheets 22. The preferred media is glass macrospheres manufactured by 3M Company. These macrospheres are hollow spheres whose walls consist of tiny glass bubbles (mocrospheres) bound together by a resin matrix. The particularly preferred macrospheres are designated Type M40X and are graded so that their effective size (0.7 mm.) and uniformity coefficient (1.6) is comparable to that of sand used in other filters. Examination of the filter bed shows that it is graded with the largest media granules at the top, and the smallest at the bottom. This is a natural property of the media, whose boyancy varies directly with size. Therefore, during operation the waste particles are removed in the lower surface of the filter. The filter bed is 12 inches deep. Solids penetration into the media is not desirable. As the waste particles build up on the surface of the media, they agglomerate. As their density increases, these particles tend to drop off of their own weight or may be scoured off by the circular flow of influent. This self-cleaning process permits less frequent backwashing of the filter. The clean influent passes into the effluent reservoir, over a weir and out of the unit.

The area above the filter or, more specifically, the effluent reservoir stores filtered water for use during backwashing. To backwash the filter, the flow through the media is reversed. The backwash water collector is located below the media. The opening on the underneath side of the collector ensures that a minimal quantity of solids is removed during backwash. When the backwash valve is opened, the effluent stored above the filter bed provides the necessary hydraulic head to cause the flow through the filter to reverse. The buoyant media is expanded by the downward flow, and the solids collected on the filter are released. These heavy solids fall rapidly to the bottom of the tank where they are scraped into the sludge hopper or sludge trough. Since the solids on the filter will settle by gravity once they are released, only a brief, e.g., five-second backwash, is required to loosen them. When the backwash valve is shut, the media quickly returns to its original position, grading itself with the largest, most buoyant granules at the top.

The bottom of the unit, as aforesaid, is equipped with a rake or scraper for thickening the sludge and moving it into a sludge hopper or sludge trough. Excess sludge is drawn off through a sludge valve communicating with the hopper or trough. If sludge concentration is not a concern, the backwash collector and valve can be eliminated. Periodic opening of the sludge valve will backwash the filter and remove the sludge simultaneously.

Tests were conducted with a 12-inch square pilot unit having one square foot of filter surface area and a 3-inch diameter column. Prior experience has shown that the 3-inch bench-scale column will provide the necessary information regarding the practicability of the process, while the 12-inch square bench-scale unit will provide necessary design information.

TEST I

A 300 mg/l clay solution was mixed and coagulated with alum and polyelectrolyte. This waste was used as influent to the 12-inch square pilot filter. Tests were performed, using various depths of media, influent flow rates and run lengths.

The minimum media depth required was 12 inches. Tests with 4-inch and 8-inch media showed that at those depths the head loss across the media bed was so slight that the backwash water would expand only a portion of the bed, giving incomplete cleaning. Larger depths of media performed satisfactorily, but were considered superfluous. Since the unit functions as a surface filter, a deep media bed is not required.

Tests were performed at flow rates of 1, 2 and 3 gpm/ft.$^2$. The filter consistently removed 100 percent of the 300 mg/l clay solids. The run length, or the time required for the head loss across the filter to increase to the point where backwashing is desirable or required, was inversely proportional to the square of the flow rate. The amount of backwash water required to clean the filter, measured as a percent of total throughput, increased with flow rate.

| Filter Efficiency at Various Flow Rates | | | |
| --- | --- | --- | --- |
| Flow Rate (gpm/ft.$^2$) | Run Length (minutes) | Effluent Suspended Solids (mg/l) | % Backwash |
| 1 | 145 | 0 | 1.7 |
| 2 | 58 | 0 | 2.2 |
| 3 | 31 | 0 | 2.7 |

The 12-inch filter was run in parallel with a downflow gravity filter containing a sand media the same size as the buoyant media. The effluent quality of the two flters was the same. However, the run length of the sand filter, or the time for the head loss to increase to the point where backwashing is desirable or required, was considerably shorter.

| Comparison With Sand Filter Performance | | |
| --- | --- | --- |
| | Buoyant Media Filter | Downflow Sand Filter |
| Flow Rate (gpm/ft.$^2$) | 1 | 1 |
| Influent S.S. (mg/l) | 300 | 300 |
| Effluent S.S. (mg/l) | 0 | 0 |

| Comparison With Sand Filter Performance | | |
| --- | --- | --- |
|  | Buoyant Media Filter | Downflow Sand Filter |
| Run Length | 145 | 17 |

TEST II

To test the filter on an industrial waste, samples of a combined waste flow, prior to clarification, from an electric power plant were obtained. The waste was coagulated with polyelectolyte, and put through the 12-inch filter at a flow rate of 2 gpm/ft.$^2$.

All of the suspended solids were removed. During the hour long test runs, backwashing was not required. The head loss across the filter increased by ¼ inch.

| Results of Filtering Power Plant Waste | | |
| --- | --- | --- |
|  | Test 1 | Test 2 |
| Flow Rate (gpm/ft.$^2$) | 3 | 2 |
| Influent S.S. | 30 | 18 |
| Effluent S.S. | 0 | 0 |

TEST III

The buoyant media filter pilot unit was then taken to a manufacturing plant to treat chrome plating process wastes. The treatment process for the chrome at this location consists of lowering the pH to 2.0 to 2.5 and adding barium carbonate. During mixing the barium carbonate combines with the chromium to form barium chromate. In a second mixing tank the pH is raised to neutral. At this point the barium chromate precipitate forms. Clarifiers then allow the precipitate to settle out. Part of the clarifier influent was diverted to the buoyant media filter, and a comparison of the filter and clarifier efficiencies was made.

| Comparison with Chromate Clarifier Performance | | |
| --- | --- | --- |
|  | Filter | Clarifier |
| Flow Rate (gpm/ft.$^2$) | 0.9 | 0.4 |
| Influent S.S.-(mg/l) | 14,963 | 14,963 |
| Effluent S.S.-(mg/l) | 13 | 2,552 |

The barium chromate floc was very fragile. At filtration flow rates over 0.9 gpm/ft.$^2$ it began to break up. At this flow rate, the filter gave excellent solids removals, and was shown to be less dependent on the quality of the chemical pretreatment for its performance than the clarifier. The amount of backwash water required was 5.8 percent of throughput, but this was dependent on the requirement for sludge blowdown from the hopper, not head loss increase across the filter. During a 6-hour test run, the filter head loss only increased ⅝".

TEST IV

In order to test the buoyant media filter's performance on a number of different wastes, the easily transported 3-inch diameter bench-scale model was constructed. As aforesaid, previous testing with this size filter model has shown that it will accurately predict the solids removal of a full-scale unit. Its run length, however, will be shorter than that of a full-scale filter.

The 3-inch bench-scale model was taken to a midwest steel mill where a gravity sand filter pilot unit was filtering a clarified lagoon effluent. The buoyant media filter was used to concentrate the solids in the backwash water from the sand filter, which had an average suspended solids content of 90 mg/l.

| Results of Filtering Steel Plant Waste | | |
| --- | --- | --- |
|  | 2 gpm/ft.$^2$ | 4 gpm/ft.$^2$ |
| Influent S.S. (mg/l) | 90 | 90 |
| Effluent S.S. (mg/l) | 1 | 1 |
| Head Increase (in.) | 1 | 2 |
| Run Length (min.) | 60 | 30 |
| Backwash | 1% | 1% |

The filter removed the same amount of solids when operated at 2 or 4 gpm/ft.$^2$, and 1 percent of throughput was sufficient to clean the media. However, when operated at 4 gpm/ft.$^2$ until the head across the filter bed increased by 2 inches, the solids formed a thick layer on the filter surface and were compacted against it. The high 30 percent backwash expansion required to clean the media allowed solids to penetrate the bed. When operated at the lower flow rate and backwashed when the head had only increased 1 inch, a 10 percent backwash expansion was sufficient to clean the media, and no solids were able to penetrate the bed.

TEST V

Process water from an organic chemicals plant was obtained for filtration tests using the 3-inch bench-scale buoyant media filter. The objective was to determine the amount of material which could be recovered from the water for reuse in the process. Tests were performed with and without the use of a polyelectrolyte to coagulate the fine material.

| Results of Filtering Process Water | | |
| --- | --- | --- |
|  | Test 1 without polyelectrolyte | Test 2 with polyelectrolyte |
| Flow Rate (gpm/ft.$^2$) | 4 | 3½ |
| Influent S.S. (mg/l) | 500 | 284 |
| Effluent S.S. (mg/l) | 28 | 4 |
| Backwash | 1% | 1% |

The 3-inch test unit was then taken to an industrial plant, where it removed iron from well water, which was to be used in the manufacturing process. The well water was first prechlorinated, when alkali was added to raise the pH. The iron was oxidized with potassium permanganate and aeration. Filtration through deep bed pressure filters then removed the iron. The buoyant media filter influent was drawn from the pressure filter influent, after the chemical treatment.

| Comparison With Deep Bed Filter For Iron Removal | | |
| --- | --- | --- |
|  | Buoyant Media Filter | Deep Bed Filter |
| Flow Rate (gpm/ft.$^2$) | 4 | 3 |
| Influent Iron (mg/l) | 3.82 | 3.82 |
| Effluent Iron (mg/l) | .64 | 1.20 |
| Influent Turbidity (NTU) | 5.4 | 5.4 |
| Effluent Turbidity (NTU) | 1.3 | 1.9 |

(NTU — NEPHLOMETRIC TURBIDITY UNITS)

Observation of the buoyant media filter's performance has shown that there are several advantages to this design.

1. The filter accepts higher loadings. It has operated effectively at higher flow rates and with greater solids loadings than conventional filter.

2. Less space is required. The design of the filter, which incorporates several functions in one piece of equipment, and its ability to handle higher flow rates, means that it does not require the area of a conventional treatment system.

3. No backwash pumps are required. The gravity backwash greatly reduces the power requirements of the filter. 4. All of the above advantages contribute to the cost savings, both capital and operational that are possible with the filter.

5. The filtration unit can be fitted to an already existing clarifier to extend its capacity or improve its operation.

6. The media is easy to remove if it is necessary to service the unit. It can be floated out of the filter, and does not require careful grading when it is replaced.

While the preferred embodiments of this invention have been illustrated and described, it will be understood that the invention may be otherwise practiced than as specifically set forth. For example, buoyant filter media other than glass macrospheres may be used, such as buoyant plastic granules. Additionally, the continuous rising and falling circulating flow of influent, which herein is produced by controlling the influent hydraulic head and/or influent flow rate, obviously could be otherwise produced within the filter by mechanical or other means. Also, specific physical arrangements and materials of construction have been disclosed, such as in connection with the buoyant media containment structure, which obviously are not critical to the practice of the invention. Accordingly, it should be clear that, within the scope of the appended claims, the invention may be practiced otherwise than as specifically illustrated and described.

What is claimed is:

1. A buoyant media containment structure for use in an upflow filter comprising:
   (a) buoyant filter media;
   (b) porous sheet means formed of a substantially porous material composition, said porous sheet means being constructed and arranged to be supported substantially horizontally in an upper portion of an upflow filter tank and to define with said tank an effluent reservoir above said porous sheet means and an influent reservoir below said porous sheet means; and,
   (c) buoyant filter media support means for capturing said buoyant filter media therein and maintaining said influent reservoir substantially free of said buoyant filter media, said support means including a honeycomb-like gridwork of downwardly open cells having sidewalls extending from a lower surface of said porous sheet means, said cells containing said buoyant filter media and substantially preventing said passage of said buoyant filter media from within one of said cells to another of said cells, said cells being substantially free of subjacent structure limiting free access of particulate waste solids, in turbid influent, to said buoyant filter media in said cells.

2. A buoyant media containment structure as in claim 1 wherein said porous sheet means is comprised of polyethylene bead composition.

3. An upflow filter comprising:
   (a) a tank
   (b) porous sheet means formed of a substantially porous material composition, said porous sheet means being mounted substantially horizontally in an upper portion of said tank to support buoyant filter media at a lower surface of said porous sheet means and to define with said tank an effluent reservoir above said porous sheet means and an influent reservoir below said porous sheet means, said influent reservoir being maintained substantially free of said buoyant filter media; and,
   (c) means to induce a continuous rising and falling circular flow of influent through said influent reservoir.

4. An upflow filter as in claim 3 which further inclues a honeycomb-like gridwork of downwardly open cells having side walls extending from the lower surface of said porous sheet means, said cells being adapted for containment therewithin of buoyant filter media and said cells being free of subjacent structure limiting free access of particulate waste solids, in turbid influent, to said buoyant filter media.

5. An upflow filter as in claim 3 in which said influent reservoir comprises an essentially open reservoir that is substantially free of obstructions to said circular flow and to the free gravitational settling of solids through influent in said reservoir to the bottom of said tank.

6. A method of upflow filtration comprising:
   (a) feeding influent into an influent reservoir in the bottom of a tank;
   (b) inducing a continuous rising and falling circular flow to said influent;
   (c) passing said influent upwardly in said tank and through a buoyant filter media;
   (d) maintaining said influent reservoir substantially free of said buoyant filter media;
   (e) receiving the filtered influent into an effluent reservoir superposed above said buoyant filter media; and,
   (f) passing said effluent from said tank.

7. A method as in claim 6 wherein said buoyant filter media comprises hollow macrospheres of glass.

8. A method as in claim 7 which further includes supporting said buoyant filter media against the lower surface of porous sheet means mounted substantially horizontally in said tank.

9. A method as in claim 8 which further includes containing said buoyant filter media within a honeycomb-like gridwork of downwardly open cells having side walls extending from the lower surface of said porous sheet means, said cells being free of subjacent structure limiting free access of particulate waste solids, in turbid influent, to said buoyant filter media.

10. A method as in claim 9 which further includes periodically performing the backwashing steps comprising:
    (a) releasing influent from an upper region of said influent reservoir for a time sufficient to permit effluent under gravity induced hydraulic head to flow back through and wash filtered particulate material from said buoyant filter media; and
    (b) terminating the release of influent while permitting said particulate material to fall substantially unrestrictedly through said influent to the bottom of said tank.

11. A method as in claim 10 which further includes controlling the rate of release of said influent such that up to about 30 percent, preferably about 10 percent, expansion of said buoyant media occurs.

* * * * *